United States Patent
Blase et al.

(10) Patent No.: US 9,991,688 B2
(45) Date of Patent: Jun. 5, 2018

(54) OPENING AID

(71) Applicant: igus GmbH, Cologne (DE)

(72) Inventors: Frank Blase, Bergisch Gladbach (DE); Thilo-Alexander Jaeker, Sankt Augustin (DE); Joerg Dommnik, Much (DE)

(73) Assignee: IGUS GMBH, Cologne (DE)

(*) Notice: Subject to any disclaimer, the term of this patent is extended or adjusted under 35 U.S.C. 154(b) by 297 days.

(21) Appl. No.: 14/781,806

(22) PCT Filed: Mar. 27, 2014

(86) PCT No.: PCT/EP2014/056133
§ 371 (c)(1),
(2) Date: Oct. 1, 2015

(87) PCT Pub. No.: WO2014/161762
PCT Pub. Date: Oct. 9, 2014

(65) Prior Publication Data
US 2016/0064908 A1    Mar. 3, 2016

(30) Foreign Application Priority Data
Apr. 3, 2013  (DE) .................... 20 2013 101 421 U

(51) Int. Cl.
*H02G 3/04* (2006.01)
*B25B 27/22* (2006.01)
(Continued)

(52) U.S. Cl.
CPC ............ *H02G 3/0475* (2013.01); *B25B 27/22* (2013.01); *F16G 13/16* (2013.01); *H02G 1/00* (2013.01); *H02G 11/006* (2013.01)

(58) Field of Classification Search
CPC .......... H02G 3/04; H02G 3/0475; H02G 1/00; H02G 11/006; F16G 13/16; B25B 27/22
See application file for complete search history.

(56) References Cited

U.S. PATENT DOCUMENTS 6,745,555 B2    6/2004   Hermey et al.

FOREIGN PATENT DOCUMENTS

DE        1173761 B        7/1964
WO    2011054881 A1        5/2011

OTHER PUBLICATIONS

English language PCT International Search Report dated Aug. 7, 2014, received in corresponding PCT Application No. PCT/EP14/56133, 2 pgs.

(Continued)

*Primary Examiner* — David B Thomas
(74) *Attorney, Agent, or Firm* — Grossman, Tucker, Perreault & Pfleger, PLLC

(57) ABSTRACT

An opening aid for an energy guide chain with chain links. At least some of the chain links at their top side have a respective transverse leg which is arranged pivotably on a side plate and which can be fixed to the other side plate. The opening aid for guidance of the transverse legs upon opening thereof has a body extending in a working direction and a lateral extension having an inclined sliding deflection surface for the transverse legs. To simplify handling and structure of the opening aid it is proposed that the extension is mounted to the body movably relative thereto and is reciprocatingly movable between a working position in which the extension is arranged extending laterally from the body in operative guiding relationship for the transverse legs and a rest position in which the extension is arranged in inoperative guiding relationship of being moved away from the working position.

15 Claims, 5 Drawing Sheets

Figures 6A, 6B, 6C:
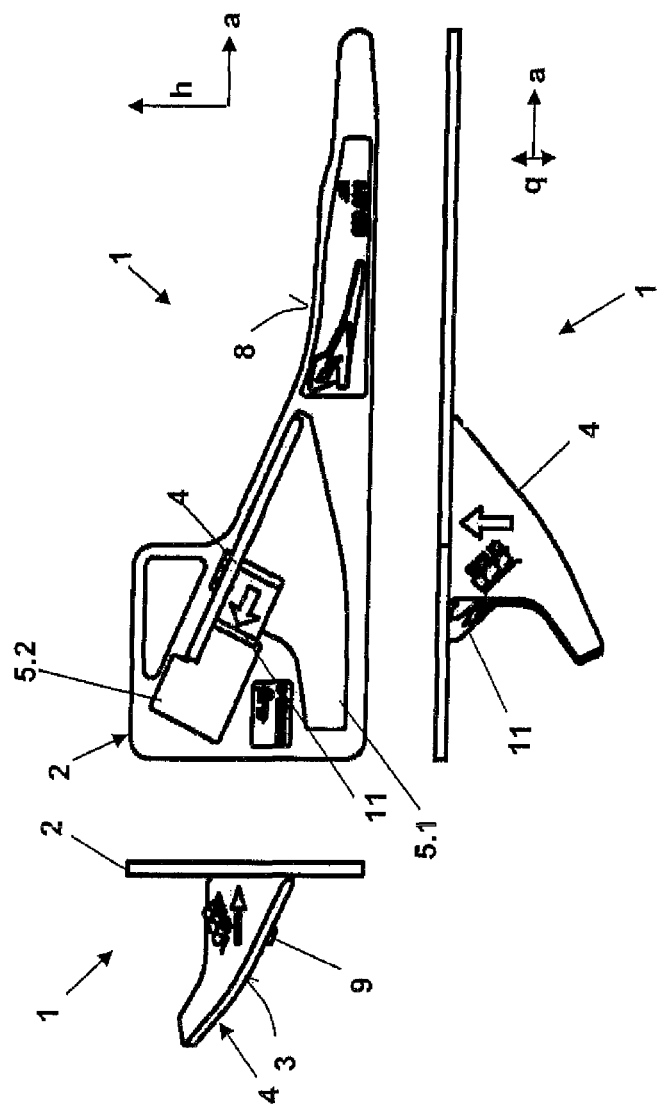

(51) Int. Cl.
*H02G 1/00* (2006.01)
*F16G 13/16* (2006.01)
*H02G 11/00* (2006.01)

(56) References Cited

OTHER PUBLICATIONS

English translation of PCT Written Opinion dated Aug. 7, 2014, received in corresponding PCT Application No. PCT/EP14/56133, 5 pgs.

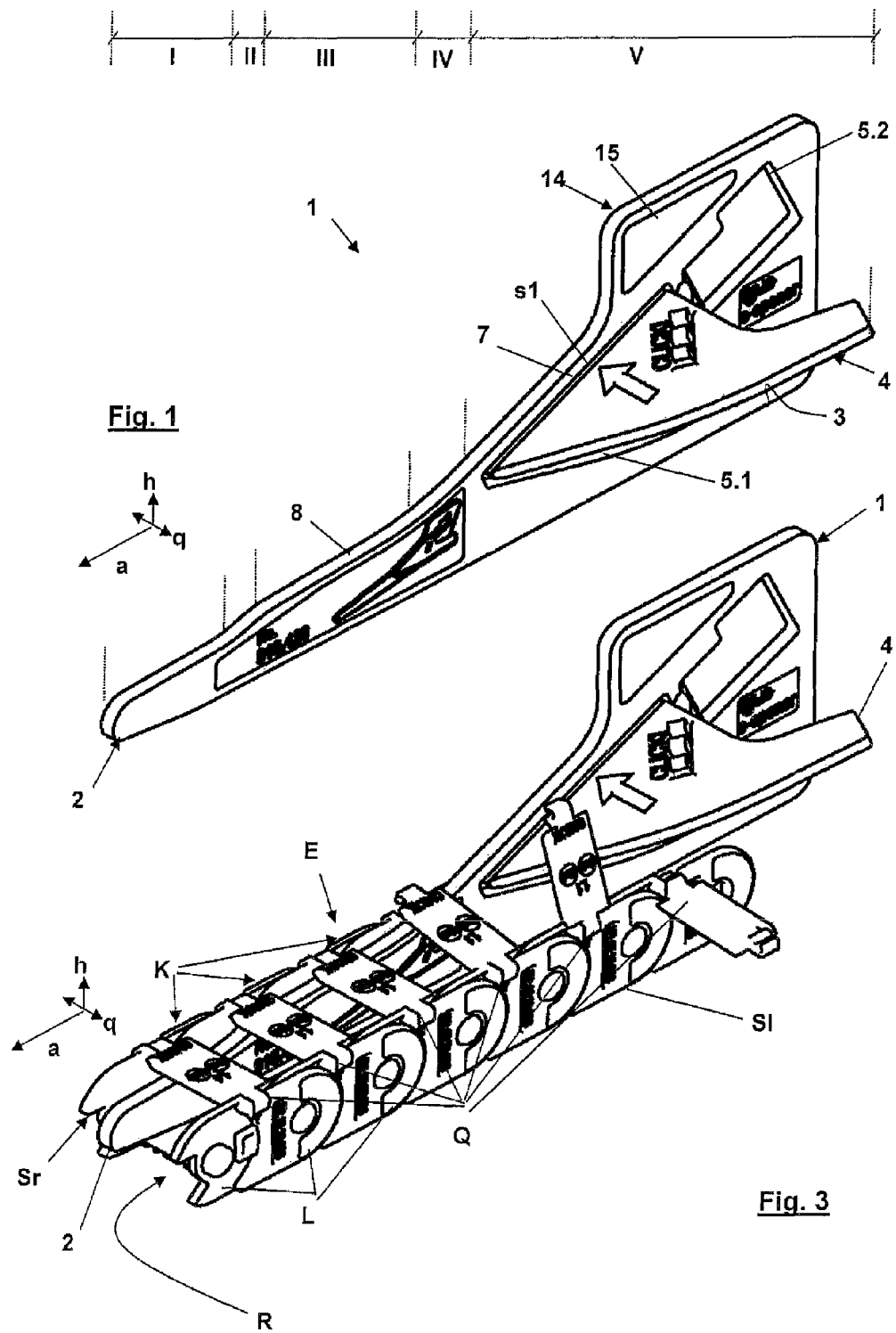

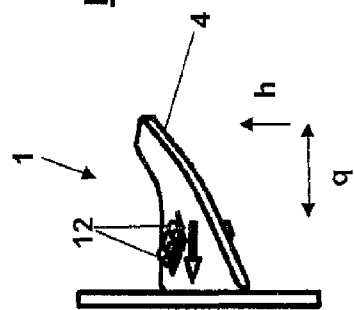
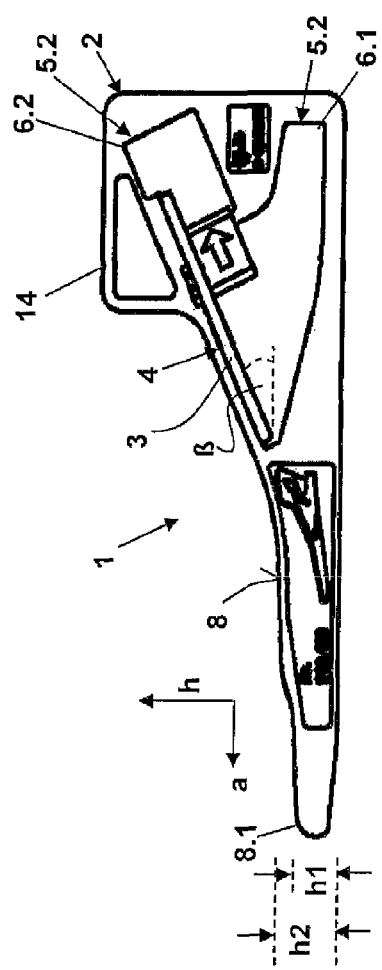
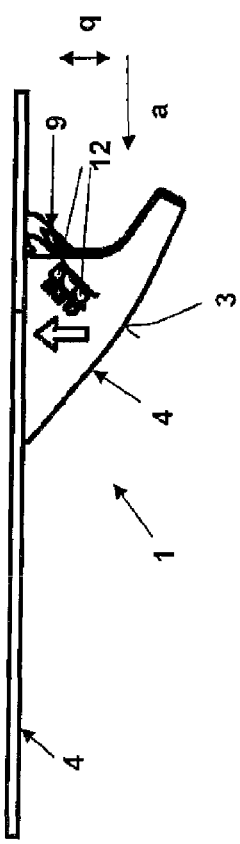
Fig. 2a
Fig. 2b
Fig. 2c

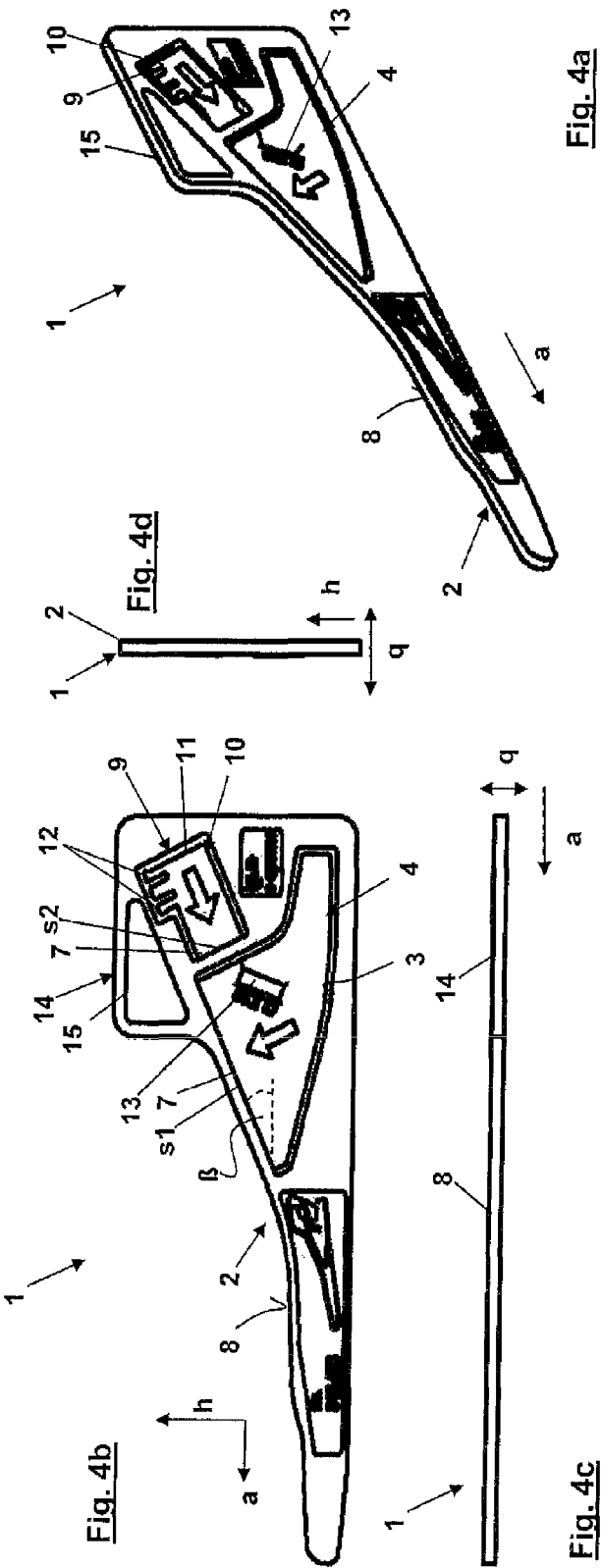

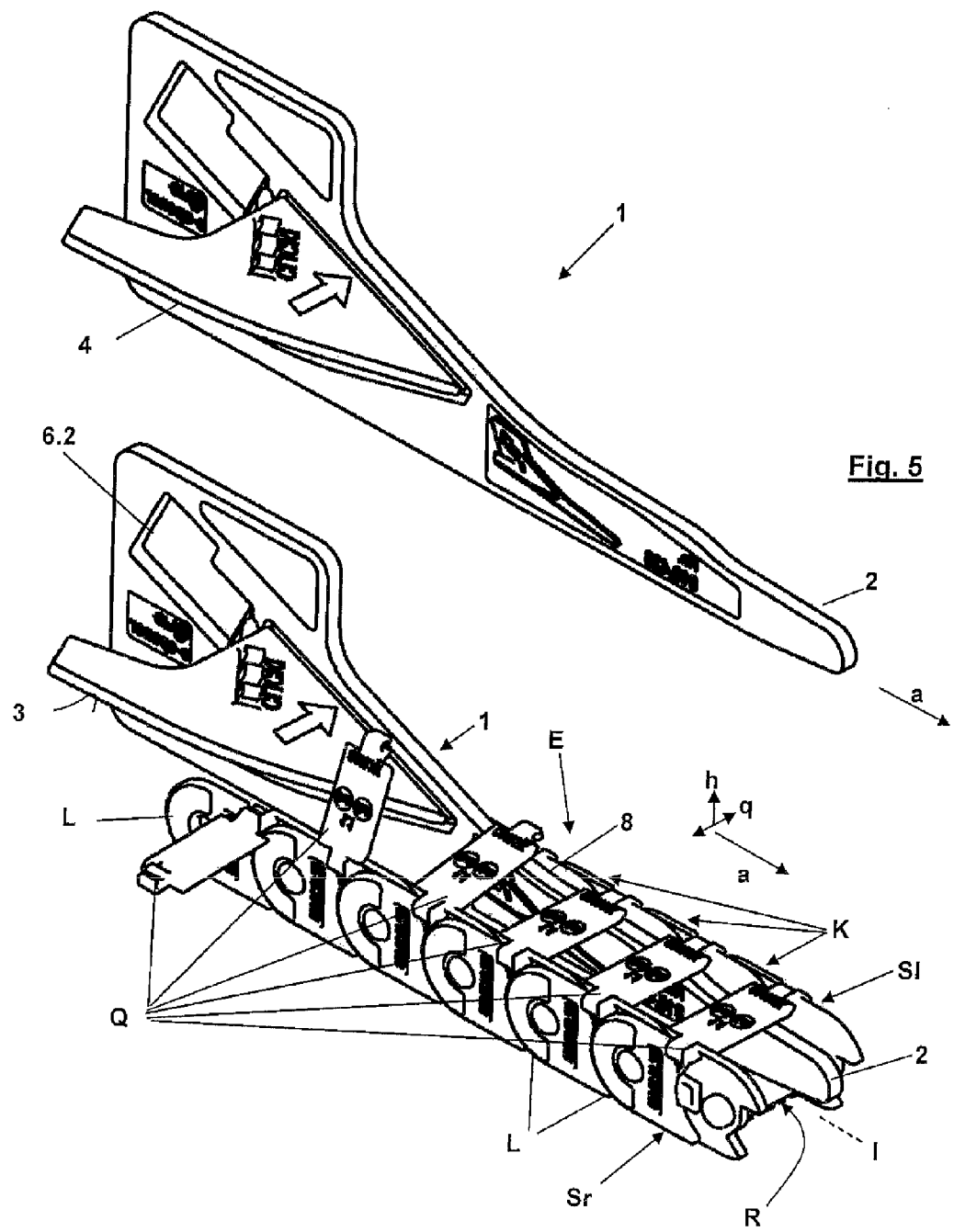

OPENING AID

FIELD

The invention concerns an opening aid for opening an energy guide chain which includes a number of chain links each having two side plates connected together at the bottom side, wherein at least some of the chain links at their top side have a respective transverse leg which is arranged pivotably on a side plate and which can be fixed to the other side plate, wherein the side plates are connected to afford a plate line and wherein the opening aid for guidance of the transverse legs upon opening thereof has a body extending in a working direction and a lateral extension having an inclined sliding deflection surface for the transverse legs.

BACKGROUND

Usually the energy guide chain is adapted to guide lines like hoses, cables or the like in an internal space in the energy guide chain, the internal space being delimited by side plates and transverse legs.

The energy guide chain has to be opened to introduce the lines into or replace the lines in the internal space in the energy guide chain. That can be done for example by means of a screwdriver or the like. Alternatively opening aids of the general kind set forth are used. Such an opening aid is usually introduced into the internal space in the working direction and displaced along the energy chain through the internal space, in such a way that it successively engages under the upper legs, while being supported in opposite relationship at the bottom side, it levers the upper legs upwardly and pivots them outwardly radially out of the internal space at the inclined sliding deflection surface. For example WO 2011/054881 A1 discloses an opening aid of the general kind set forth, which has a body made up of plates and a lateral extension mounted to the body.

SUMMARY

The object of the invention is to provide an opening aid of the general kind set forth, which is good to handle. In addition the invention seeks to provide that the opening aid is of a simple structure and is simple to manufacture.

According to the invention that object is attained by the features of the opening aid disclosed herein. The specified object is already attained in that the extension is mounted to the body movably relative thereto and is reciprocatingly movable between a working position in which the extension is arranged extending laterally from the body in operative guiding relationship for the transverse legs and a rest position in which the extension is arranged in inoperative guiding relationship of being moved away from the working position.

In that way, solely by a movement relative to the body and without release therefrom, the extension can be moved into a rest position in which it projects laterally away from the body for example for storage on site or in a store or for transport in a condition of taking up less space and thus less troublesome than in the working position. For that purpose in the state of the art the extension would have to be manually released from the body by means of a tool, whereby the opening aid with body and extension is broken down into two loose components which can be lost and has to be properly assembled again for use, in a complicated procedure.

In a possible form of the relative movement of the extension and the body relative to each other the extension can be mounted to the body linearly displaceably between the positions. In a preferred embodiment of the opening aid the extension is mounted to the body pivotably about a first pivot axis between the positions. In that way the opening aid can be structurally simplified. In addition, with the pivotal movement towards the body in the rest position it is possible to achieve a correspondingly reduced external contour.

Preferably in the rest position the extension is arranged parallel or approximately parallel to a longitudinal plane having the working direction and a heightwise direction. The longitudinal plane can thus be arranged perpendicularly to a transverse direction. In the position of use of the opening aid the longitudinal plane can be arranged parallel or approximately parallel to the side plates. In the position of use of the opening aid the transverse legs of the energy guide chain can face in the transverse direction. The extension can thus be oriented parallel to the body in the rest position to save space. In the rest position it can be arranged in slightly spaced relationship with the body, to a condition of bearing against the body.

In the rest position the extension can be arranged integrated in the body, to save space. In the rest position it can be arranged in the body, in which case it preferably projects from the inside at most to the external contour of the body or projects outwardly beyond same by a preferably small amount. In a preferred embodiment of the opening aid the body has a first receiving means in which the extension is disposed in the rest position. In that respect the receiving means is such that the lateral extension does not project beyond the external contour of the body in the rest position. In that way the opening aid can be minimised in respect of the transverse direction or lateral direction, when the lateral extension is in the rest position.

The opening aid can be adapted to be displaceable manually or automatedly in the internal space in the energy guide chain. For that purpose the opening aid can be guided at the underside against the bottom of the energy guide chain and/or can be guided laterally in an advantageous fashion in respect of the mechanical forces involved against the side plate from which the upper transverse legs are to be released in order to be pivoted by means of the opening aid on the other side plate, in particular laterally, over the internal space in the energy guide chain. For lateral guidance against the side plate the opening aid can bear laterally thereagainst over a surface area, preferably by way of provided longitudinal ribs.

The legs on the top side can be fixable to the other side plate by means of a closure element designed in the form of a latching or locking element, like a locking bar or a latching hook, in which case the other side plates are connected to form a plate line or string. Instead of a latching connection it is also possible to provide a plug-in and/or magnetic connection.

For opening an energy guide chain with the opening aid the transverse legs to be opened can firstly be moved out of their closure position on the side plate by means of a suitable tool like a screwdriver into a release position in which they bear still remaining in a loose condition against the side plate in order then in a second step to be pivoted by means of the opening aid on the other side plate into a first pivotal position such that the internal space is opened for inserting supply lines. In that case the legs can be respectively pivoted laterally beyond the internal space into a second pivotal position, with the legs sliding off against the opening aid which is movable in the working direction. In an advantageous procedure the upper legs can be levered out of their closure position with displacement of the opening aid in the internal space in the energy guide chain, and in a stroke can be further moved into one of the pivotal positions.

The first receiving means can have a first through opening which is opened on both sides and in which the lateral extension is arranged in the rest position. Particularly advantageously the lateral extension can be pivotable out of the first through opening at both sides out of the rest position laterally into a working position which is on the left side relative to the working direction or a working position which is on the right side in the working direction. In that way the lateral extension can be pivoted selectively out of the rest position into the working position on the left side or into a working position on the right side relative to the working direction. In the working position on the left side the opening aid can open the transverse legs which are respectively arranged pivotably on a side plate at the left in the working direction and on the right in the working direction they are respectively released or releasable from the other side plate.

In a converse arrangement, with a working position at the right side for the lateral projection, transverse legs can be respectively lifted into an open position, which transverse legs are connected pivotably to a respective other side plate at the right in the working direction, while at the left in the working direction they are released or releasable from a respective side plate which is at the left in the working direction. In that way transverse legs which are respectively pivoted to a side plate on the left in the working direction and which are respectively released or releasable at the right from a side plate, can be pivoted into their respective open position by means of the lateral extension which is in the left-side working position. If the lateral extension is in its working position which is at the right side relative to the working direction then by means of the opening aid introduced into the energy guide chain, they can be held pivotably to side plates which are at the right in the working direction and can be pivoted into their respective open position on the left—in the working direction—of side plates, being released or releasable from side plates at the left in the working direction, with displacement of the opening aid in the working direction.

The first pivot axis can advantageously be arranged in the longitudinal plane. In that way the left-side working position and the right-side working position of the lateral extension can be arranged in mirror image-symmetrical relationship with the longitudinal plane. In addition the first pivot axis can be arranged at an angle relative to the working direction. In that way the lateral extension can be pivoted correspondingly inclinedly relative to the working direction between the individual positions. In a preferred embodiment of the opening aid the first pivot axis can extend with an extension component in opposite relationship to the working direction and with an extension component in the heightwise direction. In that way the lateral extension can be pivoted out of the rest position with an extension component in the working direction, into its respective working position. The lateral extension can be arranged to extend in the respective working position with a directional component in opposite relationship to the working direction. This means that the transverse leg to be pivoted, with displacement of the opening aid in the working direction, with respect to the lateral extension, firstly bears at the rear in the working direction against the lateral extension near the first pivot axis, and with further displacement of the opening aid at the rear in the working direction, so slides against the extension that it is guided radially outwardly with respect to the working direction.

Preferably the body is of a plate-shaped configuration. In that way the body is of a shape which is easy to produce in terms of process engineering. The opening aid can advantageously be easily produced in the form of an injection moulding, in particular a plastic injection moulding.

Similarly to the state of the art, the body can be of a wedge-shaped tapering configuration in the working direction, at least at an end portion which is a rear end portion in the working direction. For that purpose at the underside it can have a sliding surface for guidance at the bottom side in the internal space of the energy guide chain, and it can have a sliding-on inclined surface provided at the top side for the transverse legs to be opened. The inclined sliding-on surface can thus be adapted to extend in opposite relationship to the working direction and in the heightwise direction.

The first pivot axis is advantageously arranged parallel or approximately parallel at least to the portion of the inclined sliding-on surface which is adjacent to the pivot axis. The inclined sliding-on surface can have different angles in relation to the working direction in different portions, wherein however the inclined sliding-on surface is steeper stepwise or continuously in opposite relationship to the working direction.

The extension can be of a wing-like configuration. For that purpose it can have a side edge or side surface which has the inclined sliding deflection surface and which is at the rear in the working direction.

The disclosure of WO 2011/054881 A1 is hereby incorporated into the disclosure of the present application, in particular in regard to the configuration of the inclined sliding-on surface and the inclined sliding deflection surface.

The extension can be held supported in the working position by means of a support device. That support device can preferably be in the form of a pivotal lever. The pivotal lever can be arranged on the body pivotably about a second pivot axis perpendicularly or approximately perpendicularly to the first pivot axis between a support position in which the pivotal lever engages the extension in supporting relationship with its free end and the rest position in which the pivotal lever is arranged pivoted towards the body. In that case the pivotal lever, in its support position, can support the extension in its working position. In the rest position of the pivotal lever it can be arranged pivoted towards the body, similarly to the lateral extension. Preferably the body has a second receiving means in which the pivotal lever is arranged in the rest position. The second receiving means can have a second through opening which is opened at both sides and in which the pivotal lever is arranged in the rest position. The pivotal lever can be arranged pivotably out of that second through opening at both sides out of the rest position laterally into a working position which is at the left side relative to the working direction or into a working position which is at the right side relative to the working direction. That substantially corresponds to the possible pivotal movements of the lateral extension out of its first through opening into its respective left-side and right-side working positions.

The support device in the support position can be connected at its end to the extension, preferably with latching engagement thereto.

The opening aid can lever up the transverse legs with the inclined sliding deflection surface, for which purpose the inclined sliding deflection surface can be of a configuration inclined upwardly in opposite relationship to the working direction, in its end portion which is at the rear in the working direction. That can be desirable in the case of a connection to be released between the transverse legs and the side plate, like for example in the case of a plug-in connection or a magnetic connection, the release of which requires low forces. For that purpose the inclined sliding deflection surface can be arranged to be guided on the extension towards the body in such a way that it extends closely to the body in the working direction and preferably projects beyond the body. In that way the inclined sliding deflection surface can serve close to the body as an inclined sliding-on surface and can initiate the movement of levering up the upper transverse legs. It is structurally simpler for the inclined sliding-on surface to be provided in the form of a preferably narrow upper side surface or upper edge. It can also be of a rounded configuration, which is advantageous in terms of friction.

The body and the lateral extension can be of a plate-shaped overall contour in the rest position. The body and the lateral extension in the rest position and in addition the support device in the rest position can also be of the plate-shaped overall contour. In that way the opening aid can be of a very simple shape.

Preferably the opening aid is formed in one piece. The lateral extension and/or the support device can be respectively connected to the body in integral relationship by way of a film hinge. In that way the opening aid can be in the form of a very simple injection moulding, insofar as after manufacture the lateral extension and/or the support device are arranged in one plane in the respectively associated through opening.

DRAWINGS

The present invention is described in greater detail hereinafter by means of an embodiment of the opening aid, shown in the drawing in which:

FIG. 1 shows a perspective side view of an opening aid in a working position on the left side with respect to a working direction, FIGS. 2a-c show various side views of the opening aid of FIG. 1, FIG. 3 shows a perspective side view of the opening aid of FIG. 1 in engagement into an energy guide chain in the working direction, FIGS. 4a-d each show a view of the opening aid but in a rest position, FIG. 5 shows a perspective side view of the opening aid but in a working position on the right side with respect to the working direction, FIGS. 6a-c each show a side view of the opening aid of FIG. 5, and FIG. 7 shows a perspective side view of the opening aid of FIG. 5 in engagement into the energy guide chain as shown in FIG. 3.

DETAILED DESCRIPTION

FIGS. 1 to 7 each show an opening aid 1 in various views and positions, wherein the opening aid 1 in FIGS. 3 and 4 is engaging in the working direction a in opening relationship into an internal space R in an energy guide chain comprising chain links K, and the chain links K are pivotably connected to each other in the transverse direction q perpendicularly to the working direction a. The chain links K each have two side plates L connected together at the bottom side. In the illustrated embodiment of the energy guide chain E each of its chain links K is connected at the top side with a transverse leg Q which is mounted pivotably at least at one of the side plates L parallel to a longitudinal axis I or the working direction a. The individual side plates L are pivotably connected together in the energy guide chain to provide a line or string Sl thereof which is at the left with respect to a working direction shown in relation to FIGS. 3 and 7, and a line or string Sr which is at the right in the working direction a.

The opening aid 1 has a body 2 extending in the working direction a and a lateral extension 4 having an inclined sliding deflection surface 3 for the transverse legs Q. The extension 4 is arranged on the body 2 movably relative thereto. The extension 4 is mounted reciprocatingly movable between a working position in which the extension 4 is mounted extending laterally from the body 2 in operative guiding relationship for the transverse legs Q (FIGS. 1-3 and 5-7), and a rest position in which the extension 4 is moved away from the working position and is guidingly inoperative (FIG. 4). In particular the extension 4 is mounted to the body 2 pivotably between the positions about a first pivot axis s1. In this case the extension 4 is arranged pivoted towards the body 2 in the rest position.

In the embodiment illustrated here of the opening aid 1 the body 2 has a first receiving means 5.1 for the extension 4, wherein the extension 4 in the rest position is so arranged in the first receiving means 5.1 that it does not project beyond an external contour of the body 2, and here even also constitutes the contour of the body 4. In other words the body 2 and the lateral extension 4 have a plate-shaped overall contour in the rest position.

Here the first receiving means 5.1 is in the form of a first through opening 6.1 which is opened on both sides and in which the lateral extension 4 is disposed in the rest position and out of which the lateral extension 4 is pivotable at both sides out of the rest position laterally into a working position on the left side relative to the working direction a (FIG. 3) or into a working position on the right side relative to the working direction a (FIG. 7).

The body 2 is of a plate-shaped configuration. The opening aid 1 is produced integrally by injection moulding, here by plastic injection moulding. The lateral extension 4 is connected integrally to the body 2 by way of a film hinge 7.

The first pivot axis s1 is disposed in a longitudinal plane which in FIGS. 2a, 4b and 6a is the same as the plane of the drawing and includes the working direction a and a heightwise direction h. It is set at an angle l relative to the working direction a and extends with an extent component in opposite relationship to the working direction a and an extent component in the heightwise direction h.

The body 2 converges in a wedge-shaped configuration in the working direction a. It has an inclined sliding-on surface 8 which extends in opposite relationship to the working direction a and in the heightwise direction h and which in the working position of the extension 4 blends into the inclined sliding deflection surface 3 of the extension 4, in operative guiding relationship with respect to the transverse legs Q, in opposite relationship to the working direction a.

As shown in FIG. 1 the sliding-on surface 8 has a profile which with respect to its guiding effectiveness is divided into four portions I to IV, in relation to the transverse legs Q to be opened. The portion V which adjoins it here in opposite relationship to the working direction a identifies the guiding effectiveness of the inclined sliding deflection surface 3 of the lateral extension 4 which here is of a wing-like configuration, with displacement of the opening aid 1 in the longitudinal direction I of the energy guide chain, in the internal space R therein. In FIG. 3 in which the wing-like extension 4 is shown in its working position on the left in relation to the working direction a the opening aid 1 is guided in lateral contact against the string or line Sr which here is at the right in relation to the working direction a, wherein the opening aid 1 is supported at the bottom side in the internal space R in the energy guide chain E.

The profile of the sliding-on surface 8 can be used for opening a given energy guide chain E in such a way that the first portion I, of a first height h1 which is at the rear in the working direction (FIG. 2a), in conjunction with the rounded end 8.1 of the body 4, serves only for reliably introducing the opening aid 1 into the internal space R. The second portion II is characterised by a steep rise in the sliding-on surface 8, wherein the sliding-on surface 8 at the beginning of the third portion III, of a second height h2 which is at the rear in the working direction (FIG. 2a), bears at the underside against the transverse leg Q which here is the penultimate one in the working direction a. In the portion III the transverse leg Q is released from the line or string Sr which here is at the right, in which case the third portion III has a substantially lesser slope than the second portion II so that, with displacement of the opening aid 1 in the working direction a, a greater lever moment can here be applied to the transverse leg Q. In the fourth portion IV which follows in opposite relationship to the working direction a the inclined sliding-on surface 8 is again steeper and thereby produces a lower lever force than in the third portion III. In the fourth portion IV the transverse leg Q in question is lifted with pivotal movement on the string or line S1 which here is on the left.

Alternatively the profile with the different heights h1, h2 in the first portion I and in the second portion III respectively can serve to open energy guide chains E with internal spaces R of differing heights: in the case of an energy guide chain E with a smaller height in respect of the internal space R the transverse legs Q can be levered up and/or pivoted up, while sliding at the underside against the sliding-on surface 8 in the first portion I, in order in the following portions II-IV to be further pivoted, with further sliding contact. In the case of an energy guide chain E involving a greater height in respect of the internal space R the transverse legs Q can be levered up and/or pivoted up with sliding contact at the underside against the sliding-on surface 8 in the third portion III, in order in the following portion IV to be further pivoted with further sliding contact.

In both possible uses of the opening aid illustrated the inclined sliding deflection surface 3 begins at the transition from the fourth portion IV to the fifth portion V to become guidingly operative for the transverse legs Q, insofar as in the fifth portion V the transverse legs Q are pivoted outwardly to such an extent that, as shown at the transverse leg Q which is at the front in the working direction, they are pivoted by way of their own weight into a stable position in which they are pivoted completely outwardly.

The same thing is shown in FIG. 7, wherein the wing-like extension 4 is here disposed in a right-side working position and the opening aid 1 correspondingly bears against the side string or line S1 which here is on the left, for guidance thereof. In corresponding fashion the transverse legs Q are released from the side string or line S1 which here is on the left, and pivoted on the string or line Sr which here is on the right. In both cases the opening aid 1 engages to a maximum in the internal space R in spaced relationship with the line or string Sr and S1 respectively, at which the transverse legs Q are pivotably supported, so that in that way it is possible to transmit a maximum lever moment from the opening aid 1 to the transverse legs Q.

The wing-like extension 4 is held supported in the respective working positions by means of a support device 9. The support device 9 has a pivotal lever 10 which is arranged on the body 2 pivotably about a second pivot axis s2 perpendicularly to the first pivot axis s1 between a support position as shown in FIGS. 1, 2 and 5 in which the pivotal lever 10 engages with its free end 11 in supporting relationship against the extension 4 at the underside, and the rest position in which the pivotal lever 10 is arranged pivoted towards the body 2. Similarly for the lateral extension 4, in this case also the body 2 has a second receiving means 5.2 in which the pivotal lever 10 is so arranged in the rest position that it does not project beyond the external contour of the body but is part of the contour.

Similarly to the first receiving means 5.1, the second receiving means 5.2 is in the form of a here second through opening 6.2 in which the pivotal lever 10 is disposed in the rest position. In that way the pivotal lever 10, like the extension 4, can be pivotable from the rest position laterally into a working position on the left side relative to the working direction a or into a working position on the right side relative to the working direction a, so that the pivotal lever 10 can support the wing-like extension 4 in both working positions. At its end 11 the pivotal lever 10 has latching elements here in the form of two latching hooks 12 which face away from each other and which latchingly engage in the support position into a latching opening 13 on the extension 4. That provides a stable connection between the pivotal lever 10 and the extension 4. As the pivot axes s1, s2 are perpendicular to each other the wing-like extension 4 and the latching hook 12 are respectively arranged perpendicularly to each other in the working positions so that this can provide for optimum support of the extension 4 by the pivotal lever 10.

Like the lateral extension 4, the pivotal lever 11 is also arranged in the rest position in the second receiving means 5.2 in such a way that it does not project beyond the external contour of the body 4 and even forms a part of that external contour. The pivotal lever 11 is also integrally connected to the body 2 by way of a film hinge 7.

For manual guidance thereof the opening aid 1 has at its top side a handle 14 characterised by a recess 15. Since, as can be seen for example from FIGS. 1 and 5, the latching hook 12 in the working position is pivoted out of the second through opening 6.2, that second through opening 6.2 can be used to pass therethrough a finger (not shown) of a user so that then the second through opening 6.2 also becomes part of the handle 14.

LIST OF REFERENCES 1 opening aid
2 body
3 inclined sliding deflection surface
4 extension
5.1 first receiving means
5.2 second receiving means
6.1 first through opening
6.2 second through opening
7 film hinge
8 inclined sliding-on surface
8.1 end
9 support device
10 pivotal lever 11 end
12 latching hook
13 latching opening
14 handle
15 recess
I-V region
β angle
a working direction
l longitudinal direction
q transverse direction
h heightwise direction
h1 first height
h2 second height
s1 first pivot axis
s2 second pivot axis
E energy guide chain
R internal space
K chain link
L side plate
Sl left line
Sr right line
Q transverse leg

What is claimed is:

1. An opening aid for opening an energy guide chain which includes a number of chain links each having two side plates connected together at a bottom side, wherein at least some of the chain links at a top side have a respective transverse leg which is arranged pivotably on a side plate of the two side plates and which is fixable to another side plate of the two side plates, wherein the side plates are connected to afford a plate line and wherein the opening aid has a body extending in a working direction and a lateral extension having an inclined sliding deflection surface for the transverse legs, wherein the extension is mounted to the body movably relative thereto and is reciprocatingly movable between at least one working position in which the extension is arranged extending laterally from the body in operative guiding relationship for the transverse legs and a rest position in which the extension is arranged in inoperative guiding relationship of being moved away from the at least one working position.

2. The opening aid according to claim 1, wherein the extension is mounted to the body pivotably about a first pivot axis between the working and rest positions, wherein the extension in the rest position is arranged pivoted towards the body.

3. The opening aid according to claim 1, wherein, in the rest position, the extension is arranged parallel or approximately parallel to a longitudinal plane having the working direction and a heightwise direction.

4. The opening aid according to claim 1, wherein the body has a first receiving means in which the extension is arranged in the rest position.

5. The opening aid according to claim 4, wherein the first receiving means has a first through opening which is opened at both sides and in which the lateral extension is arranged in the rest position and out of which the lateral extension is pivotable on both sides out of the rest position laterally into a left working position which is on the left side relative to the working direction or into a right working position which is on the right side relative to the working direction.

6. The opening aid according to claim 1, wherein the body is of a plate-shaped configuration.

7. The opening aid according to claim 1, wherein the body has an inclined sliding-on surface which extends in opposite relationship to the working direction and in a heightwise direction and which in the at least one working position of the extension merges in operative guiding relationship with respect to the transverse legs in opposite relationship to the working direction into the inclined sliding deflection surface of the extension.

8. The opening aid according to claim 1, wherein the extension is of a wing-like configuration having a side edge or side surface which is at a rear in the working direction and which has the inclined sliding deflection surface.

9. The opening aid according to claim 1, wherein, in the at least one working position, the extension is held supported by means of a support device.

10. The opening aid according to claim 9, wherein the support device has a pivotal lever which is arranged on the body pivotably about a second pivot axis perpendicularly or approximately perpendicularly to a first pivot axis between a support position in which the pivotal lever engages supportingly against the extension with a free end and the rest position in which the pivotal lever is arranged pivoted towards the body.

11. The opening aid according to claim 10, wherein the body has a second receiving means in which the pivotal lever is arranged in the rest position.

12. The opening aid according to claim 11, wherein the second receiving means has a second through opening which is opened on both sides and in which the pivotal lever is arranged in the rest position and out of which the pivotal lever is pivotable on both sides out of the rest position laterally into a working position which is on the left side relative to the working direction or into a working position which is on the right side relative to the working direction.

13. The opening aid according to claim 10, wherein the support device in the support position is connected at the end to the extension.

14. The opening aid according to claim 1, wherein the body and the lateral extension or the body, the lateral extension and the support device are of a plate-shaped overall contour in the rest position.

15. The opening aid according to claim 1, wherein the opening aid is formed in one piece.

* * * * *